United States Patent [19]

Sisk

[11] Patent Number: 4,494,447
[45] Date of Patent: Jan. 22, 1985

[54] SELF-LATCHING ECCENTRIC CAM FOR DUAL STROKE COMPRESSOR OR PUMP

[75] Inventor: Francis J. Sisk, San Mateo, Calif.

[73] Assignee: Westinghouse Electric Corp., Pittsburgh, Pa.

[21] Appl. No.: 438,428

[22] Filed: Nov. 2, 1982

[51] Int. Cl.³ .................... F15B 15/64; F16H 53/04; F04B 39/00
[52] U.S. Cl. .................... 92/13.3; 417/534; 74/571 R; 417/315
[58] Field of Search ............ 74/571 R; 417/534, 539, 417/429, 315; 92/13.3

[56] References Cited

U.S. PATENT DOCUMENTS

| 3,010,339 | 11/1961 | Brock | 74/571 |
| 4,143,995 | 3/1979 | Divisi | 417/315 |
| 4,236,874 | 12/1980 | Sisk | 417/315 |

Primary Examiner—William L. Freeh
Attorney, Agent, or Firm—E. C. Arenz

[57] ABSTRACT

For a dual capacity refrigerant compressor of the type which has an eccentric cam rotatable on a crankpin between two opposite positions which changes the total eccentricity of the crankpin and cam so as to obtain two different stroke lengths, the rotation of the cam on the crankpin being effected by a reversal of motor operation, the cam moves through an angle of about 270° around the crankpin so that a centrifugal force torque tending to hold the cam in place is available at least in the reduced stroke length position of the cam, and by providing lightening cavities and eccentric weightings, the center of mass 74 of the cam can be shifted to obtain the centrifugal torque in the proper direction at both the maximum and reduced stroke positions.

8 Claims, 7 Drawing Figures

SELF-LATCHING ECCENTRIC CAM FOR DUAL STROKE COMPRESSOR OR PUMP

GOVERNMENT CONTRACT

The Government has rights in this invention pursuant to Prime Contract No. W-7405-ENG-26 and Subcontract No. 86X-24712-C awarded by the U.S. Department of Energy.

BACKGROUND OF THE INVENTION

This invention pertains to the art of dual capacity compressors or pumps in which the dual capacity is obtained through changing the connecting rod stroke length from one length to another through reversal of the driving motor.

My U.S. Pat. No. 4,236,874 teaches a reciprocating refrigerant (or other gas) compressor which employs an eccentric cam rotatably mounted on the crankpin and in which the rotation of the cam on the crankpin is angularly limited by a key in a circumferentially extending recess at the interface of the cam and crankpin. On reversal of compressor rotation, the cam shifts from one angular extremity or end point to an opposite angular extremity or end point and by so doing changes the vector sum of cam eccentricity and crankpin throw so as to provide two different stroke lengths. A change in displacement and clearance ratio results and two refrigeration capacities are obtained depending on the direction of rotation of the motor. The cam is driven from one end point to the other by the fraction of compressor torque developed by the cam eccentricity.

The arrangement works satisfactorily in a compressor of the character illustrated in my patent where the cylinders are arranged radially about the crankshaft, and where a single crankpin accommodates three connecting rods. It is considered marginal where two connecting rods are accommodated on a single crankpin. However, for a compressor with more limited capacity and requiring only a single piston difficulties could be experienced in at least the shorter length mode of operation. The same difficulties could be expected to be experienced if multiple cylinders were used, but in a so-called aligned arrangement in which each of the connecting rods is accommodated by a separate crankpin, as some compressors are arranged.

The difficulty is that in at least the minimum stroke position of the cam relative to the crankpin, there is an oscillating load between the key and the stop against which the key is to be seated or "latched". In that connection, there are various changing forces which exert influence to either prevent, or to tend to cause, the oscillating load. Among the forces which generally tend to prevent the possibility of oscillation are friction forces, viscous drag loads, and cam inertia forces. Gas thrust and piston rod inertia forces will have different effects depending upon the part of the cycle. Finally, it is believed that one of the more important forces is a centrifugal force torque which, when the cam eccentricity is angled to the crankpin throw, will tend to return the cam toward a position in which the eccentricity is aligned with the crank throw. Thus, with a gas torque reversal, as is most severely experienced in a single cylinder compressor, the centrifugal force added to the reversed gas torque force will destabilize the cam positioning in the reduced stroke position.

It is the aim of my invention to provide a system in which the centrifugal force vector or torque, in at least the short stroke mode of operation, will aid in holding the cam to its one end position and thus to obtain, in effect, a self-latching of the cam in that one end position. It is a further aim of the invention to provide another embodiment in which the centrifugal force torque is available to aid the latching irrespective of which of the stroke length modes is being used.

SUMMARY OF THE INVENTION

In accordance with the invention in its essentially simplest sense, the rotation limiting means which prevents rotation of the cam on the crankpin beyond the two opposite end points is provided with a circumferential extent requiring the rotation of the cam relative to the pin to be in excess of a half circle in the repositioning of the cam from the one end point to the other end point.

In another embodiment of the invention, the cam includes means providing an imbalance on one side of the diametral line passing through the maximum and minimum thickness portions of the cam and of an extent to provide a centrifugal force torque of the cam in directions to aid in holding the key against the end points irrespective of the end point to which the cam has rotated.

DRAWING DESCRIPTION

DESCRIPTION OF THE PREFERRED EMBODIMENTS

The invention is considered applicable to compressors and pumps other than those used in the refrigeration art, but the invention will be explained in that connection.

The description will proceed in connection with the prior art structures disclosed in the noted patent to provide an explanation of one environment in which the invention may be applied, and also to provide an explanation of the problems experienced with the prior art structure. For full details of that prior art structure and the variations to which the invention of the noted patent applies, reference should be had to the noted patent.

Figure 1:
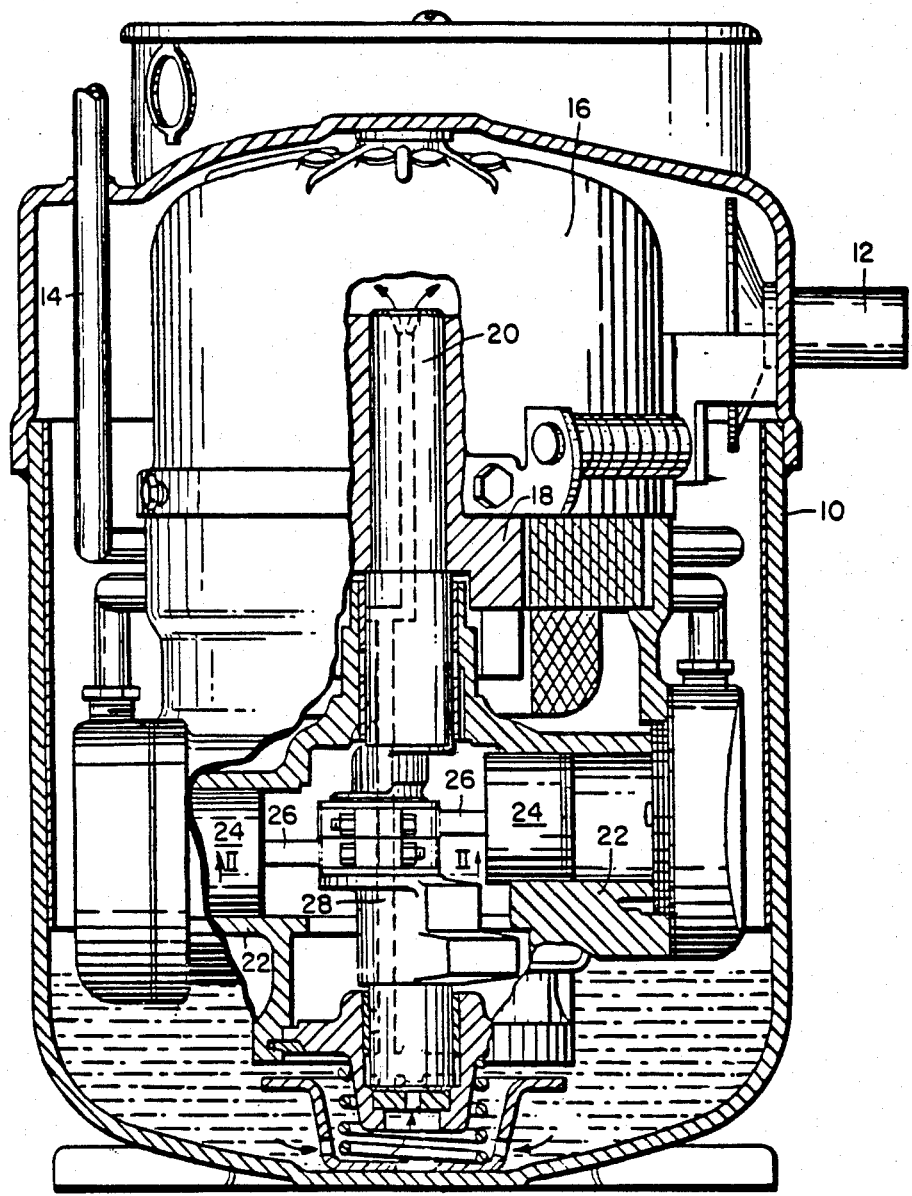
FIG. 1 is a side view of a hermetic refrigerant compressor representative of one type to which the invention may be applied, with the shell shown in cross section and certain parts being broken, this figure being a prior art figure taken from the noted patent.

Referring to FIG. 1, a generally cylindrical hermetically sealed shell 10 has an inlet 12 through which the suction gas refrigerant is admitted to the shell, and one or more discharge gas tubes 14 through which the compressed gas exits from the shell. The upper part of the shell houses a reversible electric motor 16 whose rotor 18 is fixed to the upper end of the crankshaft 20 to rotate the crankshaft in one direction or the other depending upon the direction of rotation of the rotor.

In the illustrated unit, the compressor has two cylinders 22 in which the two pistons 24 reciprocate as they are driven by the connecting rods 26 which, of course, have their one ends connected to the pistons and their other strap ends rotatably coupled to that lower portion 28 of the crankshaft which is provided with the crankpin of the crankshaft. Lubrication of the compressor is accomplished in a conventional well-known way.

Figure 2:
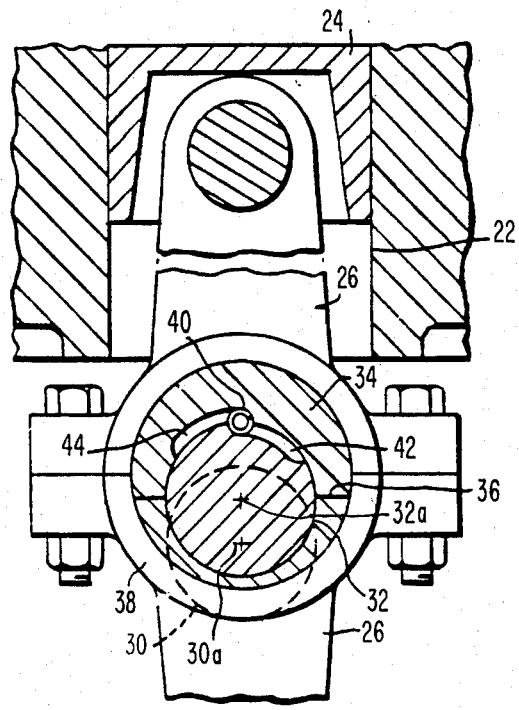
FIG. 2 is a partly broken section corresponding to one taken along the line II—II of FIG. 1, this figure also being a prior art figure taken from the noted patent.

Referring to prior art FIG. 2, the dash line circle 30 indicates the location of the part of the crankshaft 28 which is journaled in the main bearings, while the solid line circle 32 shows the location of the crankpin relative thereto. 30a and 32a indicate the center lines of the shaft and crankpin, respectively. An eccentric ring or cam 34, which derives its eccentricity from the progressively varying wall thickness of the cam in a radial direction, is mounted on the crankpin 32 in rotatable relation therewith. The cam is split as along line 36 and is held in place on the crankpin by the strap 38 of the connecting rod 26.

In FIG. 2 the means limiting the rotation of the eccentric cam 34 relative to the crankpin 32 comprises means located at the interface of the ring inner circumference and the crankpin outer circumference in the form of a key 40 which extends axially in one relieved area 42 extending along an arcuate portion of the outer circumference of the crankpin, and another relieved area 44 extending along an arcuate portion of the inner circumference of the eccentric ring, the depth of the two relief areas each equaling half the diameter of the key.

Figure 3:
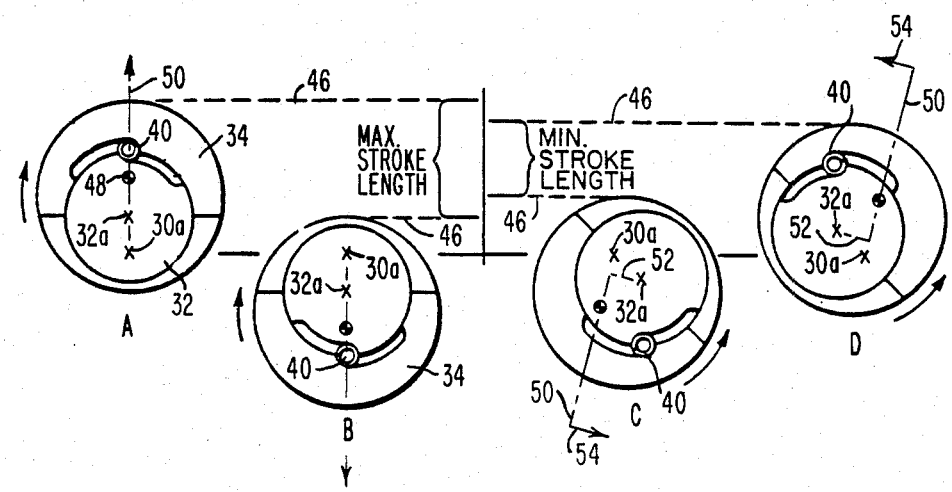
FIG. 3 is a diagrammatic view illustrating the change in stroke length obtained when the motor drives the crankshaft in one direction and alternatively in the other direction, this figure also being a prior art figure taken from the noted patent, but with the addition of the centrifugal force torque components in the various positions of the prior art arrangement.

FIG. 3 shows the way in which the means limiting the rotation of the eccentric cam relative to the crankpin between one end point and an opposite angularly displaced end point results in the addition of the maximum eccentricity of the cam to the eccentricity of the crankpin at the one end point, and at the opposite end point adding only a part of the maximum eccentricity of the ring to the eccentricity of the crankpin to give the change in stroke length. In FIG. 3A, the crankpin and cam are shown in a top dead center position under a condition of the crankshaft and crankpin rotating clockwise as indicated by the arrow. FIG. 3B shows the parts in the bottom dead center position under the clockwise rotation mode. The dash line 46 projections to the center of the drawing represent the maximum stroke length achieved under the clockwise rotation.

When the compressor has been stopped and restarted in the opposite direction by the reversible electric motor, which in FIGS. 3C and 3D is indicated as counterclockwise by the arrows, the crankshaft and crankpin will turn within the eccentric cam until limited in the relative rotation to the point where the two relieved area spaces have reversed their relationship as compared to that in FIGS. 3A and 3B. In FIG. 3C the pin and cam are shown in a bottom dead center position, while in FIG. 3D they are shown in the top dead center position. Again, the lines projected therefrom to the center of the page indicate the reduced stroke length achieved under the counterclockwise rotation.

The approximate center of mass of the eccentric cam is indicated by the symbol 48. The centrifugal force acting on the eccentric cam will be in a line passing through the center of the crankshaft 30a and the center of mass 48 and is indicated in each of the FIGS. 3A–D by the dash line arrow 50. It will be noted that in the maximum stroke length mode, the centrifugal force causes no moment because the line of action is also through the crankpin center 32a. In other words, the centrifugal force of the cam is tending to keep the cam in a position in which the eccentricity is aligned with the crank throw.

In FIGS. 3C and 3D it will be seen that the centrifugal force line 50, which passes through the crankshaft center 30a and the center of mass of the eccentric cam, is offset from the crankpin center 32a by a length perpendicular to the line 50 indicated by the dash line 52. As a result, a moment or centrifugal force torque exists with its direction being indicated by the arrows 54 in these two views. It will be apparent that the centrifugal force torque is in a direction to shift the eccentric cam away from the end points in which the key 40 is shown in FIGS. 3C and 3D toward the other end points shown in FIGS. 3A and 3B. While during a large portion of one revolution of the crankshaft, the various forces noted before are sufficient to hold the cam at the end point, during a small portion of the stroke these holding forces can go sufficiently low that the centrifugal force torque and any gas thrust reversal can move the eccentric cam slightly back toward the other end point. Thus, in at least the reduced stroke length mode of operation, an oscillating load can be imposed upon the parts making up the rotation limiting means.

In the arrangement according to the invention as shown in FIGS. 4–7, those parts which correspond to the prior art parts of FIGS. 1 and 3 are given identical numerals. Thus, the crankshaft 30 carries the crankpin 32 upon which the eccentric cam 34 is rotatably mounted. The key 40 is secured in the eccentric cam 34 and projects into a recess 56 provided in the outer circumferential face of the crankpin 32. The one and opposite end points 58 and 60 of the recess are angularly displaced approximately 270° in the embodiment shown. Thus, these end points are reversed in their angular sense from the end points of the prior art arrangement so that when the eccentric cam is pushed by the compressor torque from the maximum stroke length position of FIG. 4 to the reduced stroke length position of FIG. 5, the cam will have rotated on the crankpin through the long angle rather than the short angle route.

Figure 4:
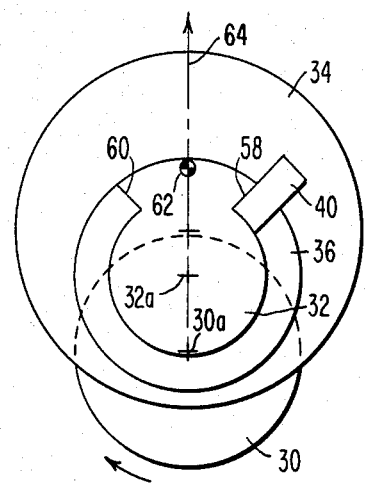
FIG. 4 is a view in the nature of a face view showing the relation of the eccentric cam, the crankpin, and the crankshaft journal and the rotation limiting means in accordance with the invention with the parts in a maximum length stroke position.
Figure 5:
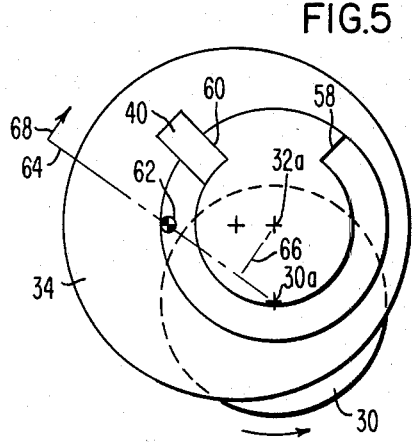
FIG. 5 is a view similar to FIG. 4 of the same arrangement with the parts in a reduced length stroke position.

The approximate center of mass of the eccentric cam 34 in FIGS. 4 and 5 is indicated by the symbol 62 and the centrifugal force line of the eccentric cam is indicated by the dash line 64, that line passing as in any such arrangement through the center of mass and the crankshaft center 30a. It will be observed in FIG. 4 that the centrifugal force line 64 also passes through the crankpin center 32a so that there is no moment or centrifugal force torque imposed upon the cam to rotate away from its position upon the crankpin. However, in FIG. 5, showing the reduced stroke length position, the dash line 66 which extends perpendicularly from the centrifugal force line 64 to the crankpin center 32a and represents a moment results in a centrifugal force torque indicated by the arrow 68 which has a direction opposite to the direction of rotation of the crankshift and crankpin. Thus, with the arrangement of FIGS. 4 and 5, the cam effectively self-latches itself in at least the lesser stroke length position shown in FIG. 5 through the centrifugal force torque.

Figure 6:
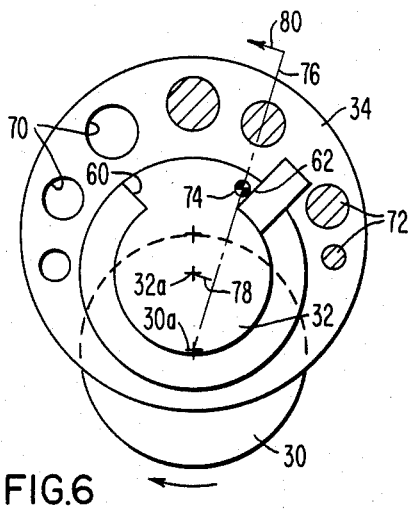
FIG. 6 is a view similar to FIG. 4 with the parts in the maximum stroke length position, but with the center of mass of the eccentric cam of this alternative embodiment rearranged through cam imbalancing means.
Figure 7:
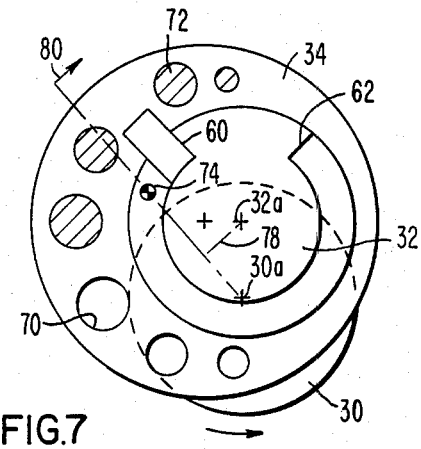
FIG. 7 is a view similar to FIG. 5 with the alternative embodiment in the reduced stroke length position.

While in most applications it would be expected that a centrifugal force torque would not be needed when the eccentric cam is in its maximum throw position, there may be instances in some applications, according to the structure and operating characteristics of the device, where a centrifugal force torque component would be desirable when operating in the maximum stroke length mode. In accordance with another aspect of my invention as shown in FIGS. 6 and 7, it is possible to obtain this torque by providing an imbalance on one side of the cam; the sides in this sense meaning those on the opposite sides of a diametral line passing through the maximum and minimum thickness portions of the cam. One way of obtaining this imbalance is to remove material from the cam on the one side as by way of the holes 70 drilled in the cam and by loading other parts of the cam by inserting material (such as lead) 72, which is heavier than the cam material, in the holes on the other side of the cam. As a result, the center of mass 74 is shifted from its original position so that in the maximum stroke length position the centrifugal force line 76, which again passes through the crankshaft center 30a and the center of mass has a moment 78 and a centrifugal force torque indicated by the arrow 80 is in a direction opposite to the direction of rotation of the crankshaft and crankpin. Other combinations of weight addition and/or removal are obvious.

It will be seen from FIG. 7 that even though the center of mass 74 has been shifted to provide the imbalance, a centrifugal force torque 80 is still available when the cam is positioned in its reduced stroke length position, and in a direction in opposition to the rotative direction of the crankshaft.

It will be appreciated that since the centrifugal force torque is a product of the quantity of the mass and the moment, the relation of the torque forces in the opposite directions can be varied in accordance with the extent of lightening and loading to provide the imbalance.

In the application of the invention to a refrigerant compressor useful in a heat pump especially adapted for northern climate operation, providing the two opposite end points 58 and 60 at around 90° apart provides good results. Thus, the eccentric cam moves through about 270° between its two rotative positions on the crankpin. However, the principle of the invention is considered to be applicable so long as the movement of the cam around the crankpin is at least in excess of 180°, or a half turn. In most applications of the invention, it is believed that providing the end points somewhere between about 70° and 120° apart will provide good results.

I claim:

1. In a dual capacity compressor of the type having different stroke lengths through motor operation driving a crankshaft in one and an opposite direction effecting rotative repositioning of an eccentric cam on a crankshaft crankpin for a longer stroke length at one end point and a shorter stroke length at an opposite angularly displaced end point of rotation limiting means preventing rotation of said cam on said crankpin beyond said end positions, the improvement comprising:
said rotation limiting means has a circumferential extent requiring the rotation of said cam relative to said crankpin to be significantly in excess of 180° in repositioning from one end point to the other end point to obtain a centrifugal force torque component urging said cam in a rotative direction opposite the direction of rotation of said crankpin at at least one of said end points to promote maintaining the rotative repositioning of said cam on said crankpin;
said centrifugal force torque component at said end points being a function of the distance between the center of said crankpin, and a centrifugal force line which passes through the center of mass of said cam and the center of said crankshaft.

2. In a compressor according to claim 1 wherein:
said rotation limiting means comprises a circumferential recess at the interface of the opposing faces of said cam and crankpin, and key means in said recess.

3. In a compressor according to claim 2 wherein:
said recess is provided in the outer circumferential face of said crankpin and said key means is connected to said cam.

4. In a compressor according to claim 3 wherein:
said cam includes means providing an imbalance on one side of a diametral line passing through the maximum and minimum thickness portions of the cam, and of an extent to provide a centrifugal force torque of the cam in a direction to aid in holding said key against said end points irrespective of the end point at which the key resides.

5. In a dual capacity refrigerant compressor of the type having different stroke lengths through motor operation driving a crankshaft, in one and an opposite direction effecting rotative repositioning of an eccentric cam on a crankshaft crankpin for a longer stroke length at one end point and a shorter stroke length at the opposite angularly displaced end point of a recess at the interface of said cam and crankpin, and through which recess a key moves between said one end point to said opposite end point in accordance with motor direction, the improvement comprising:
said recess extends significantly in excess of 180° so that said cam effectively self latches to said crankpin in at least said lesser stroke length position through centrifugal force torque of said cam in a direction to hold said key to said opposite end point;
said centrifugal force torque at said opposite end point being a function of the distance between the center of said crank pin, and a centrifugal force line which passes through the center of mass of said cam and the center of said crankshaft.

6. In a compressor according to claim 5 wherein:
said recess is provided in the outer circumferential face of said crankpin and said key means is connected to said cam.

7. In a compressor according to claim 6 wherein:
said cam includes means providing an imbalance on one side of a diametral line passing through the maximum and minimum thickness portions of said cam and of an extent to provide a centrifugal force torque on the cam in directions to aid in holding said key means against said end points irrespective of the end point against which the key means resides.

8. In a compressor according to claim 6 wherein:
said end points are angularly displaced in the range of about 70° to 120°, and said recess extends throughout the remainder of the circumferential extent of the circle.

* * * * *